United States Patent
Sasidharan Pillai et al.

(10) Patent No.: US 12,514,263 B2
(45) Date of Patent: Jan. 6, 2026

(54) PEA ALBUMIN ISOLATE FROM PEA SOLUBLES AND PROCESS FOR PRODUCTION THEREOF

(71) Applicant: Louis Dreyfus Company Plant Proteins LLC, Livermore, CA (US)

(72) Inventors: Prasanth Kumar Sasidharan Pillai, Livermore, CA (US); Manoj Kumar, Livermore, CA (US)

(73) Assignee: Louis Dreyfus Company Plant Proteins LLC, Livermore, CA (US)

( * ) Notice: Subject to any disclaimer, the term of this patent is extended or adjusted under 35 U.S.C. 154(b) by 0 days.

(21) Appl. No.: 19/183,737

(22) Filed: Apr. 18, 2025

(65) Prior Publication Data
US 2025/0325001 A1    Oct. 23, 2025

Related U.S. Application Data

(60) Provisional application No. 63/636,440, filed on Apr. 19, 2024.

(51) Int. Cl.
    *A23J 1/14*    (2006.01)
(52) U.S. Cl.
    CPC ..................... *A23J 1/14* (2013.01)
(58) Field of Classification Search
    CPC ........ A23J 3/14; A23J 1/14; A23J 3/16; A23J 1/006; A23J 1/142; A23J 3/346; A23J 3/00; A23L 33/185; A23L 2/66; A23L 11/00; A23L 19/00
    USPC .................................. 426/655, 656, 425, 46
    See application file for complete search history.

(56) References Cited

U.S. PATENT DOCUMENTS

| | | | |
|---|---|---|---|
| 4,208,323 A | 6/1980 | Murray et al. | |
| 4,500,454 A | 2/1985 | Chang | |
| 11,304,435 B2 | 4/2022 | Foster et al. | |
| 11,523,622 B2 | 12/2022 | Wnukowski et al. | |
| 11,571,002 B2 | 2/2023 | Kizer et al. | |
| 11,673,924 B2 | 6/2023 | Lecocq et al. | |
| 2011/0274797 A1* | 11/2011 | Segall .................. | A23L 2/66 426/431 |
| 2017/0238590 A1 | 8/2017 | Bansal-Mutalik et al. | |
| 2018/0355120 A1 | 12/2018 | Kotaka et al. | |
| 2020/0154732 A1 | 5/2020 | Shi et al. | |

(Continued)

FOREIGN PATENT DOCUMENTS

| CA | 2878482 | 1/2014 |
|---|---|---|
| CA | 3010624 | 7/2017 |

(Continued)

OTHER PUBLICATIONS

Adenekan, et al.; "Effect of isolation techniques on the characteristics of pigeon pea (*Cajanus cajan*) protein isolates"; Food Science & Nutrition; vol. 6, No. 1, pp. 146-152 (Jan. 2018).

(Continued)

Primary Examiner — Hong T Yoo
(74) Attorney, Agent, or Firm — Edward J. Baba; Andrew R. Guzman; Bozicevic, Field & Francis LLP (57) ABSTRACT

The present invention provides a pea albumin isolate (PAI) extraction process comprising salt induced protein extraction from a pea soluble byproduct (pea solubles), the pea albumin isolate (PAI) produced by the PAI extraction process of the present disclosure and use thereof.

14 Claims, 6 Drawing Sheets

(56) References Cited

U.S. PATENT DOCUMENTS

| | | |
|---|---|---|
| 2021/0274807 A1 | 9/2021 | Homyak et al. |
| 2021/0276907 A1 | 9/2021 | Zhang et al. |
| 2022/0015387 A1 | 1/2022 | Zhang et al. |
| 2022/0022490 A1 | 1/2022 | Calmon et al. |
| 2022/0030908 A1 | 2/2022 | Liuming et al. |
| 2022/0039431 A1 | 2/2022 | Mcfarlane et al. |
| 2022/0046950 A1 | 2/2022 | Buche et al. |
| 2022/0053793 A1 | 2/2022 | Schmitt et al. |
| 2022/0117259 A1 | 4/2022 | Takayanagi et al. |
| 2022/0408773 A1 | 12/2022 | Bender et al. |
| 2023/0106315 A1 | 4/2023 | Dlubak et al. |
| 2023/0240322 A1 | 8/2023 | Segall et al. |

FOREIGN PATENT DOCUMENTS

| | | |
|---|---|---|
| CN | 113115909 | 4/2023 |
| KR | 2024-079333 | 6/2024 |
| WO | WO 2021/260169 | 12/2021 |
| WO | WO 2022/112292 | 6/2022 |
| WO | WO 2022/117917 | 6/2022 |
| WO | WO 2022/136627 | 6/2022 |
| WO | WO 2022/243253 | 11/2022 |
| WO | WO 2023/017033 | 2/2023 |
| WO | WO 2023/137569 | 7/2023 |

OTHER PUBLICATIONS

Chereau et al., "Combination of existing an alternative technologies to promote oilseeds and pulses proteins in food applications", OCL 2016, 23(4) D406.

Cui, et al.; "Identification of extraction pH and cultivar associated aromatic compound changes in spray dried pea protein isolate using untargeted and targeted metabolomic approaches"; Journal of Agriculture and Food Research; vol. 2, No. 100032, pp. 1-10 (Dec. 2020).

Cui, et al.; "Functionality and structure of yellow pea protein isolate as affected by cultivars and extraction pH"; Food Hydrocolloids; vol. 108, No. 106008, pp. 1-13 (Nov. 2020).

Emkani, et al.; "Pea Protein Extraction Assisted by Lactic Fermentation: Impact on Protein Profile and Thermal Properties"; Foods; vol. 10, No. 3, Article 549, pp. 1-15 (2021).

Gao, et al.; "Effect of alkaline extraction pH on structure properties, solubility, and beany flavor of yellow pea protein isolate"; Food Research International; vol. 131, No. 109045, pp. 1-9 (May 2020).

Hansen et al., "Structure-Function Guided Extraction and Scale-Up of Pea Protein Isolate Production", Foods 2022, 11, 3773.

Lam et al., "Pea protein isolates: Structure, extraction, and functionality", Food Reviews International, 34(2), 126-147.

Langton, et al.; "Gelation of faba bean proteins—Effect of extraction method, pH and NaCl"; Food Hydrocolloids; vol. 103, No. 105622, pp. 1-8 (Jun. 2020).

Sethi, et al.; "Optimization of process parameters for extraction of protein isolates from Khesari dhal (*Lathyrus sativus* L)"; LWT; vol. 137, No. 110368, pp. 1-9 (Feb. 2021).

Sun et al., "Gelatin properties of salt-extracted pea protein induced by heat treatment", Food Research International 43 (2010) 509-515.

Tanger et al., "Influence of extraction conditions on the conformational altercation of pea protein extracted from pea flour", Food Hydrocolloids 107 (2020) 105949.

Yang et al., "Selective Complex Coacervation of Pea Whey Proteins with Chitosan To Purify Main 2S Albumins", Journal of Agricultural and Food Chemistry, 2020, 68(6), 1698-1706.

\* cited by examiner

PEA ALBUMIN ISOLATE FROM PEA SOLUBLES AND PROCESS FOR PRODUCTION THEREOF

CROSS-REFERENCE TO RELATED APPLICATIONS

This application claims priority benefit to the filing date of U.S. Patent Application Ser. No. 63/636,440, filed on Apr. 19, 2024, the disclosure of which application is herein incorporated by reference in its entirety.

BACKGROUND OF THE INVENTION

Pea protein research and development has grown recently due to their unique functionality compared to soy, wheat, and other plant proteins. Peas are rich in storage proteins, including salt solution-soluble globulins and water-soluble albumins (Lam et al. (2018) Food Reviews International, 34(2), 126-1470). Globulins make up approximately 80% of total storage protein available in peas and albumins make up the remaining 20% (Chereau et al. (2016) OCL—Oilseeds and Fats, Crops and Lipids, 41(1) D406). Plant albumins possess functionality comparable to that of egg white proteins, including their ability to foam, emulsify, gel, and stay soluble at acidic pHs, which could prove valuable in a variety of food, beverage, pharmaceutical, and beauty ingredient applications. During the conventional isoelectric precipitation procedure, which involves a relatively quick pH manipulation combined with intermittent centrifugation stages to aid in the proteins' separation, globulins crash out and are processed into a protein-rich final product (pea protein isolate or PPI). Due to the small molecular size of albumins and water solubility, albumins tend to remain solubilized throughout the entire isoelectric precipitation process unlike their larger and heavier globulin counterparts (Yang et al. (2020) Journal of Agricultural and Food Chemistry, 68(6), 1698-1706). This wet extraction method is currently the industry standard, even though it yields a large waste stream of the albumin-rich soluble fraction (Pea Solubles). An economically viable process for the pea albumin purification from the pea solubles, other than very expensive membrane-based purification processes, has yet to be developed. Therefore, there is a significant need for cost-effective and operationally simplified means of extracting pea proteins from pea solubles.

The present invention provides an innovative new pea-albumin extraction process from the pea solubles that adds an additional high value protein ingredient into the plant proteins ingredient portfolio for food and beverage applications.

SUMMARY OF THE INVENTION

The present invention provides a process for a pea albumin isolate (PAI) extraction process from pea solubles. More specifically, the process comprises salt induced pea albumin protein extraction from pea solubles without membrane filtration.

In one aspect of the invention, the present invention provides a pea albumin isolate (PAI) extraction process comprising salt induced protein extraction from pea solubles.

In some embodiments, the pea solubles are obtained from a pea protein isolate (PPI) extraction process. In some embodiments, the PPI extraction process comprises a salt extraction step using Na, Ca, or Mg salt or a combination thereof. In other embodiments, the PPI extraction process comprises an isoelectric precipitation (IEP). In still other embodiments, the PPI extraction process comprises a salt extraction step using Na, Ca, or Mg salt or a combination thereof in combination with IEP. In certain embodiments, the Na, Ca, or Mg salt in the PPI extraction process is selected from NaCl, $CaCl_2$), $MgCl_2$, sodium hexametaphosphate (SHMP), sodium triphosphate (STP), $CaPOCl_3$, calcium perchlorate, sodium sulfite, sodium bisulfite, sodium thiocyanate and calcium thiocyanate, or combination thereof.

In some embodiments, the pea solubles may have a protein content in the range of about 80 to about 95 wt % (N×6.25) on a dry basis. In other embodiments, the pea solubles may contain about 15 to about 30% albumin. In other embodiments, the pea solubles may comprise PS-I albumin and PS-II albumin.

In one aspect of the invention, the present invention provides a pea albumin isolate (PAI) extraction process comprising a) salt induced protein extraction from the pea solubles. In some embodiments, the salt induced protein extraction from the pea solubles is performed at a pH of about 3 to about 8, at a temperature of about 18° C. to about 95° C. for about 30 to about 60 minutes with about 0.5 to about 5% concentration of Na, Ca, or Mg salt or a combination thereof. In certain embodiments, the Na, Ca, or Mg salt in the PPI extraction process is selected from NaCl, $CaCl_2$), $MgCl_2$, sodium hexametaphosphate (SHMP), sodium triphosphate (STP), $CaPOCl_3$, calcium perchlorate, sodium sulfite, sodium bisulfite, sodium thiocyanate and calcium thiocyanate, or combination thereof.

In some embodiments, the pea albumin isolate (PAI) extraction process further comprises b) separation of protein isolate from the solution.

In some embodiments, the pea albumin isolate (PAI) extraction process further comprises c) washing protein isolate from step b).

In some embodiments, the pea albumin isolate (PAI) extraction process further comprises d) dilution of protein to form a slurry.

In some embodiments, the pea albumin isolate (PAI) extraction process further comprises e) homogenization and sterilization of protein slurry.

In some embodiments, the pea albumin isolate (PAI) extraction process further comprises f) drying protein slurry.

In one aspect of the invention, the present invention provides a pea albumin isolate (PAI) extracted by the process of the present disclosure.

In some embodiments, the PAI comprises protein, fat, phytates, carbohydrates and ash. In some embodiments, the pea albumin isolate comprises PS-I albumin and PS-II albumin.

In certain embodiments, the PAI has a protein content in the range of about 70 to about 95 wt % (N×6.25) on a dry basis. In certain embodiments, the pea albumin isolate further comprises i) less than about 1% of fat, ii) about 0.1 to 0.5% of phytates, iii) about 2 to 6% of carbohydrates, and iv) about 2 to 10% of ash.

In some embodiments, the PAI has thermal stability. In certain embodiments, the pea albumin isolate is thermally stable up to about 130° C. In certain embodiments, the pea albumin isolate has a thermal transition from about 130° C. to about 144° C. In certain embodiments, the pea albumin isolate has a thermal transition peak at about 134.5° C.

In some embodiments, the PAI has at least 92% purity. In some embodiments, the pea albumin isolate is substantially in its native form.

In one aspect of the invention, the present invention provides use of the PAI of the present disclosure in the production of a foam. In another aspect of the invention, the present invention provides use of the PAI of the present disclosure in the production of a gel. In still another aspect of the invention, the present invention provides use of the PAI of the present disclosure in the production of an emulsion. In some embodiments, the emulsion is made from a mixture of equal parts oil and water.

In one aspect of the invention, the present invention provides a foam comprising the PAI of the present disclosure. In another aspect of the invention, the present invention provides a gel comprising the PAI of the present disclosure. In still another aspect of the invention, the present invention provides an emulsion comprising the PAI of the present disclosure.

In one aspect of the invention, the present invention provides use of the PAI of the present disclosure in a food or beverage application. In another aspect, the present invention provides a food or beverage comprising the PAI of the present disclosure.

DETAILED DESCRIPTION OF THE INVENTION

The present invention provides a process for a pea albumin isolate (PAI) extraction process from pea solubles. More specifically, the process comprises salt induced protein extraction.

Before the present processes, compositions and uses are described, it is to be understood that this invention is not limited to the particular methods or compositions described, which may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "about", particularly in reference to a given quantity, is meant to encompass deviations of plus or minus five percent.

The term "extracting" or "extraction" means the removal or separation of one or more component(s) of a multicomponent composition. The concept of extracting a protein isolate from a seed protein flour is well known in the present art.

The term "pea solubles" used herein refers to the soluble fraction obtained from a precipitation step of a pea protein isolate (PPI). Any PPI extraction process well known in the art can be applied to obtain the pea solubles. In some cases, PPI extraction process uses a salt extraction step using Na, Ca, or Mg salt or a combination thereof. In other cases, PPI extraction process uses an isoelectric precipitation (IEP). In other cases, the PPI extraction process uses salt extraction step using Na, Ca, or Mg salt or a combination thereof in combination with IEP.

The term "isoelectric precipitation (IEP)" refers to a method used to recover proteins from various sources. It involves adjusting the pH of a protein solution to its isoelectric point, which is the pH at which the protein has no net charge. At this pH, the protein molecules aggregate and precipitate out of solution.

The term "pea protein isolate (PPI)" used herein refers to the final product of pea protein extraction from the pulse of legumes of the genus Pisum. It's a highly concentrated protein substance. Pea protein isolate is the extracted protein created through a chemical process that separates protein from other elements of peas.

Figure 1:
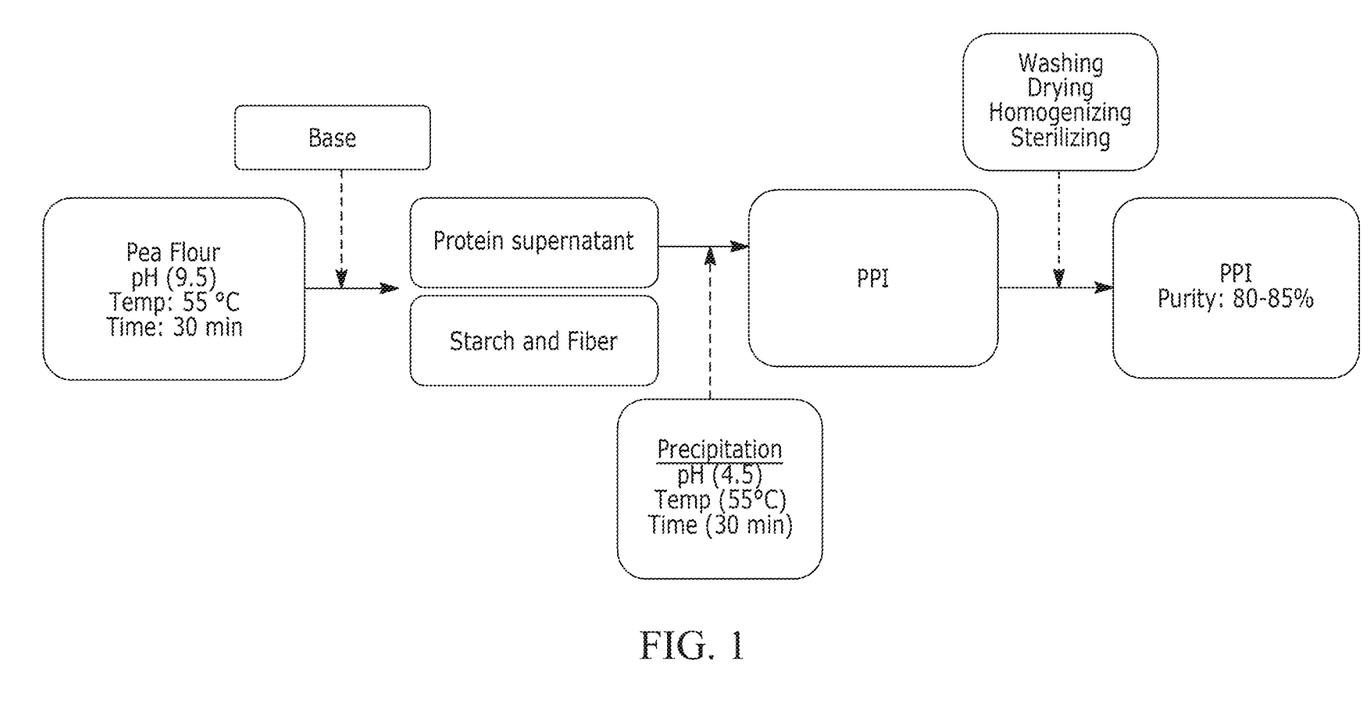
FIG. 1 depicts the conventional PPI extraction process of diagram.

The term "conventional PPI" used herein refers to PPI with substantially less albumin than the present invention, produced by the conventional PPI extraction process, which is well known technique in the art. For example, the conventional PPI extraction process does not comprise the albumin precipitation step using Na, Ca, or Mg salt or combination thereof of the present invention. The conventional PPI extraction process is depicted in FIG. 1.

The term "temperature pretreatment" and "heat treatment" are interchangeably used herein.

The term "substantially in native form" in the context of proteins in legume seed flour means that the proteins have not been denatured due to, for example, exposure to excessive heat, such that the 3-dimensional structure of the proteins are generally maintained in the form found in the pre-processed seed.

Pea Albumin Isolate (PAI) and Legume Albumin Isolate (LAI) Extraction Process

In one aspect of the invention, the present invention provides a pea albumin isolate (PAI) extraction process from pea solubles comprising salt induced protein extraction from the pea solubles. In some embodiments, the pea solubles can be produced during the process of producing albumin enriched pea protein isolate. In one aspect of the invention, the present invention provides a legume albumin isolate (LAI) extraction process from legume solubles comprising salt induced protein extraction from the legume solubles. In some embodiments, the legume solubles can be produced during the process of producing albumin enriched legume protein isolate.

The pea albumin isolate extraction process of the present disclosure may produce a range of different protein yields. By "protein yield" it is meant as the percent yield of the total protein extracted from the pea solubles. For instance, the PAI extraction process has at least about 30% to at least about 70%, at least about 30% to at least about 65%, at least about 30% to at least about 60%, at least about 30% to at least about 55%, at least about 30% to at least about 50%, at least about 35% to at least about 70%, at least about 35% to at least about 65%, at least about 35% to at least about 60%, at least about 35% to at least about 55%, at least about 35% to at least about 50%, at least about 40% to at least about 70%, at least about 40% to at least about 65%, at least about 40% to at least about 60%, at least about 40% to at least about 55%, at least about 40% to at least about 50%, at least about 45% to at least about 70%, at least about 45% to at least about 65%, at least about 45% to at least about 60%, at least about 45% to at least about 55%, or at least about 45% to at least about 50% of the total protein in the pea solubles. In some embodiments, the PAI extraction process has at least about 35% to at least about 65% total protein in the pea solubles.

The legume albumin isolate extraction process of the present disclosure may produce a range of different protein yields. By "protein yield" it is meant as the percent yield of the total protein extracted from the legume solubles. For instance, the PAI extraction process has at least about 30% to at least about 70%, at least about 30% to at least about 65%, at least about 30% to at least about 60%, at least about 30% to at least about 55%, at least about 30% to at least about 50%, at least about 35% to at least about 70%, at least about 35% to at least about 65%, at least about 35% to at least about 60%, at least about 35% to at least about 55%, at least about 35% to at least about 50%, at least about 40% to at least about 70%, at least about 40% to at least about 65%, at least about 40% to at least about 60%, at least about 40% to at least about 55%, at least about 40% to at least about 50%, at least about 45% to at least about 70%, at least about 45% to at least about 65%, at least about 45% to at least about 60%, at least about 45% to at least about 55%, or at least about 45% to at least about 50% of the total protein in the legume solubles. In some embodiments, the PAI extraction process has at least about 35% to at least about 65% total protein in the legume solubles.

A) Starting Materials

For preparing pea solubles or legume solubles, which is the soluble fraction obtained from a PPI or legume protein isolate (LPI) extraction process, starting materials can be any kind of beans or peas which contain albumin as a source. Pea proteins can be classified into four major groups: albumin, globulin, prolamin, and glutelin, where the majority are globulins (65-80%) and albumins (10-20%). For example, beans or peas which contain albumin include, but are not limited to, legumes, soybeans and winged beans. The legumes include, but are not limited to chickpeas, garbanzo beans, lentils, peas, green peas, kidney beans, black beans, soy beans, pinto beans, navy beans, peanuts, haricot bean, lima bean, butter bean, adzuki bean, *mungo* bean, golden gram, black gram, green gram, scarlet runner bean, rice bean, moth bean, tepary bean, *faba* bean, horse bean, broad bean, field bean, Bengal gram, cowpea, blackeye pea, pigeon pea, congo bean, Bambara groundnut, earth pea, and the like.

In some embodiments, starting materials for PPI extraction may be prepared as pea flour, legume flour, and the like. In order to prepare the starting materials, raw pea seeds or raw legume seeds undergo pre-treatment steps such as cleaning, drying, sorting, dehulling, and splitting that allow the detachment of the hulls and the cotyledons from whole pulses. This pre-treatment to pea seeds or legume seeds is a well-known technique in the art.

In some embodiments, the flour is produced from pea. In some embodiments, the flour is produced from green pea. In some embodiments, the flour is produced from chickpea. In some embodiments, the flour is produced from garbanzo bean. In some embodiments, the flour is produced from lentils. In some embodiments, the flour is produced from kidney bean. In some embodiments, the flour is produced from black bean. In some embodiments, the flour is produced from soy bean. In some embodiments, the flour is produced from pinto bean. In some embodiments, the flour is produced from navy bean. In some embodiments, the flour is produced from peanut. In some embodiments, the flour is produced from haricot bean. In some embodiments, the flour is produced from lima bean. In some embodiments, the flour is produced from butter bean. In some embodiments, the flour is produced from adzuki bean. In some embodiments, the flour is produced from *mungo* bean. In some embodiments, the flour is produced from golden gram. In some embodiments, the flour is produced from green gram. In some embodiments, the flour is produced from black gram. In some embodiments, the flour is produced from scarlet runner bean. In some embodiments, the flour is produced from rice bean. In some embodiments, the flour is produced from moth bean. In some embodiments, the flour is produced from tepary bean. In some embodiments, the flour is produced from *faba* bean. In some embodiments, the flour is produced from horse bean. In some embodiments, the flour is produced from broad bean. In some embodiments, the flour is produced from field bean. In some embodiments, the flour is produced from Bengal gram. In some embodiments, the flour is produced from cowpea. In some embodiments, the flour is produced from blackeye pea. In some embodiments, the flour is produced from pigeon pea. In some embodiments, the flour is produced from congo bean. In some embodiments, the flour is produced from Bambra groundnut. In some embodiments, the flour is produced from earth pea.

B) PPI or LPI Extraction Process

In some embodiments, the pea solubles can be obtained from any well-known PPI or LPI extraction process. The general process is described in FIG. 1. In other embodiments, the pea or legume solubles can be produced during a PPI or LPI wet extraction process or a pea or legume protein purification and/or concentration process. In certain embodiments, the pea or legume solubles can be obtained from a precipitation step of the PPI or LPI extraction process.

During the traditional isoelectric precipitation procedure, which involves a relatively quick pH manipulation combined with intermittent centrifugation stages to aid in the proteins' separation, globulins crash out and are processed into a protein-rich final product. Due to the small molecular size of albumins and water solubility, they tend to remain solubilized throughout the entire isoelectric precipitation process unlike their larger and heavier globulin counterparts (Yang et al. (2020) Journal of Agricultural and Food Chemistry, 68(6), 1698-1706). This wet extraction method is currently the industry standard, even though it yields a large waste stream of the albumin-rich soluble fraction.

In other embodiments, the PPI extraction process is as described in contemporaneously filed U.S. patent application Ser. No. 18/614,150 or PCT Patent Application US2025/020722. U.S. patent application Ser. No. 18/614,150 or PCT Patent Application US2025/020722 are specifically incorporated by reference herein.

In an exemplary embodiment, pea solubles or legume solubles are generated by milling flour from peas or legumes and subjecting the flour to alkaline conditions to generate a protein fraction which is further separated into a protein rich supernatant and a starch rich pellet via solid-liquid separation methods. The protein rich supernatant is further purified by isoelectric precipitation and separated via solid-liquid separation method to yield a protein rich pellet (PPI or LPI) and protein light supernatant. The protein light is concentrated using filtration and/or evaporation to achieve a minimum solid content of 45% thereby generating the solubles.

The flour produced from peas or legumes, i.e., pea flour or legume flour, may be subjected to a range of different alkaline conditions. For instance, the flour suspended in a solution having an alkaline pH. Alkaline pH includes, without limitation, pH 8, pH 8.5, pH 9, pH 9.5, pH 10, pH 10.5, pH 11, pH 11.5, pH 12, etc. The alkaline pH may be a range of alkaline pH. For instance, the alkaline pH may be from at least about pH 8 to at least about pH 12, from at least about pH 8 to at least about pH 11, from at least about pH 8 to at least about pH 10, from at least about pH 8 to at least about pH 9, from at least about pH 8.5 to at least about pH 12, from at least about pH 8.5 to at least about pH 11, from at least about pH 8.5 to at least about pH 10, from at least about pH 8.5 to at least about pH 9, from at least about pH 9 to at least about pH 12, from at least about pH 9 to at least about pH 11, from at least about pH 9 to at least about pH 10, etc. In some embodiments, the solution is water that has been adjusted to an alkaline pH.

The protein fraction produced from subjecting the flour, e.g., pea flour or legume flour, to alkaline conditions may be separated into a protein rich supernatant and a starch rich pellet via solid-liquid separation methods. Various methods of solid-liquid separation are known in the art. For instance, the solid-liquid separation method includes, without limitation, centrifugation, decanter centrifugation, filtration, pressure filtration, sedimentation, screw press separation, etc. In some embodiments, the solid-liquid separation is centrifugation. In some embodiments, the solid-liquid separation is decanter centrifugation. In some embodiments, the solid-liquid separation is filtration. In some embodiments, the solid-liquid separation is pressure filtration. In some embodiments, the solid-liquid separation is sedimentation. In some embodiments, the solid-liquid separation is screw press separation.

The protein rich supernatant may be further purified using isoelectric precipitation. Isoelectric precipitation involves the adjusting of the pH of the solution such that the net primary charge of a protein becomes zero. The pH of the solution for the isoelectric precipitation may be a range of different pH. For instance, the pH may be at least about pH 2, at least about pH 2.5, at least about pH 3, at least about pH 3.5, at least about pH 4, at least about pH 4.5, at least about pH 5, at least about pH 5.5, at least about pH 6, at least about pH 6.5, or at least about pH 7. The pH of the solution may be from at least about pH 2 to at least about pH 7, from at least about pH 2 to at least about pH 6, from at least about pH 2 to at least about pH 5, from at least about pH 2 to at least about pH 4, from at least about pH 2 to at least about pH 3, from at least about pH 3 to at least about pH 7, from at least about pH 3 to at least about pH 6, from at least about pH 3 to at least about pH 5, from at least about pH 3 to at least about pH 4 from at least about pH 4 to at least about pH 7, from at least about pH 4 to at least about pH 6, from at least about pH 4 to at least about pH 5, from at least about pH 5 to at least about pH 7, or from at least about pH 5 to at least about pH 6. In some embodiments, the pH used for the isoelectric precipitation is from at least about pH 4 to at least about pH 6.

(2) Pea Albumin Isolate (PAI) and Legume Albumin Isolate (LAI) Extraction Process a) Salt Induced Protein Extraction from Pea Solubles or Legume Solubles In one aspect of the invention, the pea albumin isolate (PAI) or legume albumin isolate (LAI) extraction process comprises a) salt induced protein extraction from the pea or legume solubles obtained from the PPI or LPI extraction processes described in the preceding section.

In some embodiments, the salt induced protein extraction of step a) is performed i) at a pH of about 3 to about 8, ii) at a temperature of about 18° C. to about 95° C., iii) for about 30 to about 60 minutes, iii) including about 0.5 to about 5% concentration of Na, Ca, or Mg salt or a combination thereof. In some embodiments, the salt induced protein extraction of step a) is a precipitation process.

In certain embodiments, pH of the salt induced protein extraction of step a) is in the range of pH 2 to 8, pH 2.5 to 8, pH 2 to pH 7, pH 2 to pH 6, pH 2 to pH 5, pH 2 to pH 4, pH 2 to 3.5, pH 2.5 to pH 8, pH 2.5 to pH 7, pH 2.5 to pH 6, pH 2.5 to pH 5, pH 2.5 to pH 4, pH 2.5 to pH 3.5, pH 3 to 8, pH 3.5 to 8, pH 4 to 8, pH 4.5 to 8, pH 5 to 8, pH 5.5 to 8, pH 6 to 8, pH 7 to 8, pH 4 to 7.5, pH 4 to 7, pH 4 to pH 6.5, or pH 4 to 6. In certain embodiments, the salt induced protein extraction of step a) is done at pH 2, pH, 2.1, pH 2.2, pH, 2.3, pH 2.4, pH 2.5, pH 2.6, pH 2.7, pH 2.8, pH 2.9, pH 3, pH 3.1, pH 3.2, pH 3.3, pH 3.4, pH 3.5, pH 3.6, pH 3.7, pH 3.8, pH 3.9, pH 4.0, pH 4.1, pH 4.2, pH 4.3, pH 4.4, pH 4.5, pH 4.6, pH 4.7, pH 4.8, pH 4.9, pH 5.0, pH 5.1, pH 5.2, pH 5.3, pH 5.4, pH 5.5, pH 5.6, pH 5.7, pH 5.8, pH 5.9, pH 6.0, pH 6.1, pH 6.2, pH 6.3, pH 6.4, pH 6.5, pH 6.6, pH 6.7, pH 6.8, pH 6.9, pH 7.0, pH 7.1, pH 7.2, pH 7.3, pH 7.4, pH 7.5, pH 7.6, pH 7.7, pH 7.8, pH 7.9, pH 8.0. In some embodiments, pH of the salt induced protein extraction of step a) is in the range of pH 2.5 to 3.5.

In certain embodiments, the salt induced protein extraction of step a) is performed at a temperature of about 18° C. to about 95° C. In certain embodiments, the temperature for the salt induced protein extraction of step a) is in the range of about 20 to about 95° C., about 25 to about 95° C., about 30 to about 95° C., about 35 to about 95° C., about 40 to about 95° C., about 45 to about 95° C., about 50 to about 95° C., about 55 to about 95° C., about 60 to about 95° C., about 65 to about 95° C., about 70 to about 95° C., about 50 to about 90° C., about 50 to about 85° C., about 50 to about 80° C., about 50 to about 75° C., about 50 to about 70° C., about 60 to about 95° C., about 60 to about 90° C., about 60 to about 85° C., about 60 to about 80° C., about 60 to about 75° C., about 18 to about 60° C., about 18 to about 50° C., about 18 to about 40° C., or about 18 to about 35° C. In certain cases, the temperature for the salt induced protein extraction of step a) is in the range of about 50 to about 95° C. In certain cases, the temperature for the salt induced protein extraction of step a) is in the range of about 50 to about 90° C.

In some embodiments, the Na, Ca, or Mg salt in step a) is selected from NaCl, $CaCl_2$), $MgCl_2$, sodium hexametaphosphate (SHMP), sodium triphosphate (STP), $CaPOCl_3$, calcium perchlorate, sodium sulfite, sodium bisulfite, sodium thiocyanate and calcium thiocyanate. In certain embodiments, the salt in step a) is SHMP, STP, calcium perchlorate, $CaPOCl_3$, or combination thereof. In certain embodiments, the salt in step a) is SHMP. In certain embodiments, the salt in step a) is STP. In certain embodiments, the salt in step a) is calcium perchlorate. In certain embodiments, the salt in step a) is $CaPOCl_3$.

In some embodiments, the salt induced protein extraction of step a) utilizes about 0.5 to about 5% concentration of the salt. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

In some embodiments, the salt induced protein extraction of step a) is performed for about 30 to about 60 minutes. In some embodiments, the salt induced protein extraction of step a) is performed for about 30 to about 80 minutes. In certain embodiments, the salt induced protein extraction of step a) is performed for about 30 minutes, about 35 minutes, about 40 minutes, about 45 minutes, about 50 minutes, about 55 minutes, about 60 minutes, about 65 minutes, about 70 minutes, about 75 minutes, about 80 minutes. In certain embodiments, the salt induced protein extraction of step a) is performed for about 60 minutes.

In some embodiments, the salt induced protein extraction of step a) may be a precipitation process.

In some embodiments, the salt induced protein extraction of step a) comprises double precipitation process to improve albumin and/or globulin content. In some embodiments, the double precipitation process comprises a-1) precipitating protein at pH 7 to 8 with Na, Ca, or Mg salt or combination thereof; and then a-2) precipitating the remaining fraction of the protein at pH 4 to 5 with Na, Ca, or Mg salt or combination thereof.

In some embodiments, the precipitation of protein of a-1) step is done at the range of pH 7 to pH 9, pH 7 to pH 8.5, pH 7 to pH 8. In some cases, the precipitation protein of a-1) step is done at pH 7, pH 7.1, pH 7.2, pH 7.3, pH 7.3, pH 7.5, pH 7.6, pH 7.7, pH 7.8, pH 7.9, pH 8.0, pH 8.5, pH 9.0. In some embodiments, the precipitation of protein of step a-1) is performed for 5 minutes to 30 minutes. In certain embodiments, precipitation of protein is performed for about 5 minutes, about 10 minutes, about 15 minutes, about 20 minutes, about 25 minutes, or about 30 minutes.

In some embodiments, the precipitation of the remaining fraction of the protein of a-2) step is done at the range of pH 4 to 6, pH 4 to 5.5, pH 4 to 5. In some cases, the precipitation of the remaining fraction of the protein of a-2) step is done at pH 4, pH 4.1, pH 4.2, pH 4.3, pH 4.4, pH 4.5, pH 4.6, pH 4.7, pH 4.8, pH 4.9, pH 5.0, pH 5.1, pH 5.2, pH 5.3, pH 5.4, pH 5.5, pH 5.6, pH 5.7, pH 5.8, pH 5.9, pH 6.0. In some embodiments, the precipitation of the remaining fraction of step a-2) is performed for 5 minutes to 30 minutes. In certain embodiments, the precipitation of the remaining fraction of step a-2) is performed for about 5 minutes, about 10 minutes, about 15 minutes, about 20 minutes, about 25 minutes, or about 30 minutes.

In some embodiments, the salt induced protein extraction of step a) optionally comprises heat pretreatment of the pea or legume solubles prior to the precipitation.

In some embodiments, the heat treatment of the pea or legume solubles is performed at a temperature of about 50° C. to about 80° C., about 55° C. to about 75° C., about 55° C. to about 80° C., about 50° C. to about 80° C., about 50° C. to about 80° C., about 50° C. to about 80° C., about 50° C. to about 80° C., about 50° C. to about 80° C., about 50° C. to about 80° C., about 50° C. to about 80° C., about 50° C. to about 80° C., or about 50° C. to about 80° C. In certain embodiments, the heat treatment of the pea or legume solubles is performed at a temperature of about 55° C. to about 75° C.

In some embodiments, time for the heat treatment of the pea or legume solubles is about 5 minutes to 60 minutes. In other embodiments, the heat treatment of the pea or legume solubles is about 30 minutes to 60 minutes. In certain embodiments, time for the heat treatment of the pea or legume solubles is about 5 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes.

In some embodiments, the heat treatment of the pea or legume solubles prior to the precipitation may be optionally performed with Na, Ca, or Mg salt or combination thereof. In certain embodiments, the Na, Ca or Mg salt is selected from NaCl, $CaCl_2$), $MgCl_2$, sodium hexametaphosphate (SHMP), $CaPOCl_3$, sodium triphosphate (STP), calcium perchlorate, sodium sulfite, sodium bisulfite, sodium thiocyanate, and calcium thiocyanate. In certain embodiments, the salt is SHMP or $CaPOCl_3$. In other embodiments, the heat treatment of the liquid fraction from step a) may be performed without Na, Ca, or Mg salt or combinations thereof.

In some embodiments, the salt(s) for the heat treatment are at a total concentration of about 0.1 to about 5%. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

In some embodiments, solid concentration of the resultant obtained from the salt induced protein extraction in step a) is about 3 to 30%. In certain embodiments, solid concentration of the resultant obtained from the salt extraction in step a) is about 3 to 25%, about 3 to 20%, about 10 to 20%, or 15 to 20%.

B) Separation of PAI or LAI from the Solution

In one aspect of the invention, the PAI or LAI extraction process comprising a) salt induced protein extraction from a pea or legume solubles further comprises b) separation of solids from the solution, producing a liquid fraction. In certain embodiments, the liquid fraction from step b) is supernatant.

In some embodiments, the separation of step b) is performed by centrifugation. The solids of pea source or legume source are then separated from the aqueous component, producing a liquid fraction for further processing. Means for separating solids from aqueous component are well known in the art. A common method of separation is centrifugation. In certain embodiments, the centrifugation is performed at 5000 g for about 10 minutes at room temperature. In certain embodiments, the centrifugation is performed at 15000 g for about 30 minutes at 4° C.

In other embodiments, the separation of step b) is performed by decanting. Any method or combination of methods of separation may be employed, and the determination of a proper method of separating a liquid fraction from the solids is well within the skill of the ordinary artisan.

c) Washing Protein Isolate from Step b)

In one aspect of the invention, the pea albumin isolate (PAI) or legume albumin isolate (LAI) extraction process further comprises c) washing protein isolate from step b). In some embodiments, the protein isolate from step d) is washed two times at precipitation pH such as pH in the range of about pH 2 to 8, pH 2.5 to 8, pH 2 to pH 7, pH 2 to pH 6, pH 2 to pH 5, pH 2 to pH 4, pH 2 to 3.5, pH 2.5 to pH 8, pH 2.5 to pH 7, pH 2.5 to pH 6, pH 2.5 to pH 5, pH 2.5 to pH 4, pH 2.5 to pH 3.5, pH 3 to about 8, pH 3.5 to 8, pH 4 to 7.5, pH 4 to 7, pH 5 to 8, pH 5 to 7.5, or pH 5 to 7. In certain embodiments, the salt induced protein extraction of step a) is done at pH 2, pH, 2.1 pH 2.2, pH, 2.3 pH 2.4, pH 2.5, pH 2.6, pH 2.7, pH 2.8, pH 2.9, pH 3, pH 3.1, pH 3.2, pH 3.3, pH 3.4, pH 3.5, pH 3.6, pH 3.7, pH 3.8, pH 3.9, pH 4.0, pH 4.1, pH 4.2, pH 4.3, pH 4.4, pH 4.5, pH 4.6, pH 4.7, pH 4.8, pH 4.9, pH 5.0, pH 5.1, pH 5.2, pH 5.3, pH 5.4, pH 5.5, pH 5.6, pH 5.7, pH 5.8, pH 5.9, pH 6.0, pH 6.1, pH 6.2, pH 6.3, pH 6.4, pH 6.5, pH 6.6, pH 6.7, pH 6.8, pH 6.9, pH 7.0, pH 7.1, pH 7.2, pH 7.3, pH 7.4, pH 7.5, pH 7.6, pH 7.7, pH 7.8, pH 7.9, pH 8.0.

d) Dilution of Protein Slurry

In one aspect of the invention, the pea albumin isolate (PAI) or LAI extraction process further comprises d) dilution of protein slurry. The separated protein is diluted with water adjusted its pH to about pH 7, creating a protein slurry.

e) Homogenization and Sterilization of Protein Slurry

In one aspect of the invention, the pea albumin isolate (PAI) or LAI extraction process further comprises e) homogenization and sterilization of protein slurry. In some embodiments, the protein slurry is homogenized by means known in the art. For example, a high pressure homogenizer may be used. The homogenized protein slurry is then sterilized and/or pasteurized. Means for sterilizing protein for use in foods are known in the art. In some embodiments, the sterilization temperature is in the range of 75 to 140° C., 80 to 140° C., 90 to 140° C., 100 to 140° C., 75 to 130° C., 75 to 120° C., 75 to 110° C., or 75 to 100° C. An example of such a means is direct steam injection. The protein slurry may be subjected to direct steam injection for between 2 seconds and 10 minutes, such as 2 seconds, 5 seconds, 10 seconds, 15 seconds, 20 seconds, 25 seconds, 30 seconds, 35 seconds, 40 seconds, 45 seconds, 50 seconds, 55 seconds, 1 minutes, 2 minutes, 3 minutes, 4 minutes, 5 minutes, 6 minutes, 7 minutes, 8 minutes, 9 minutes, 10 minutes.

f) Drying Protein Slurry

In one aspect of the invention, the pea albumin isolate (PAI) or LAI extraction process further comprises f) drying protein slurry. The protein slurry is dried using a drying apparatus known in the art. Several such apparatuses, such as spray dryers, freeze dryers, ring dryers, dispersion dryers, drum dryers and fluid bed dryers, are commercially available. The resulting pea or legume protein isolate may then be used as further described below.

A Pea Albumin Isolate (PAI) or Legume Albumin Isolate (LAI)

In one aspect of the invention, the present invention provides a pea albumin isolate (PAI) extracted by the process of the present disclosure. The pea albumin isolate (PAI) extraction process from a pea solubles is described in the section "Pea Albumin Isolate (PAI) Extraction Process" above. The pea albumin isolate is also referred to herein as PAI.

In one aspect of the invention, the present invention provides a legume albumin isolate (LAI) extracted by the process of the present disclosure. The legume albumin isolate (LAI) extraction process from a legume solubles is described in the section "Legume Albumin Isolate (LAI) Extraction Process" above. The legume albumin isolate is also referred to herein as LAI.

In some embodiments, the pea albumin isolate comprises protein, fat, phytates, carbohydrates and ash. In some embodiments, the pea albumin isolate comprises PS-I albumin and PS-II albumin.

In some embodiments, the legume albumin isolate comprises protein, fat, phytates, carbohydrates and ash. In some embodiments, the pea albumin isolate comprises PS-I albumin and PS-II albumin.

In certain embodiments, the pea albumin isolate has a protein content in the range of about 70 to about 93 wt % (N×6.25) on a dry basis. In certain embodiments, the pea albumin isolate has a protein content of more than 90 wt % (N×6.25) on a dry basis. In certain embodiments, the pea albumin isolate further comprises i) less than about 1% of fat, ii) about 0.1 to 0.5% of phytates, iii) about 4 to 6% of carbohydrates, and iv) about 4 to 10% of ash.

In certain embodiments, the legume albumin isolate has a protein content in the range of about 70 to about 93 wt % (N×6.25) on a dry basis. In certain embodiments, the legume albumin isolate has a protein content of more than 90 wt % (N×6.25) on a dry basis. In certain embodiments, the legume albumin isolate further comprises i) less than about 1% of fat, ii) about 0.1 to 0.5% of phytates, iii) about 4 to 6% of carbohydrates, and iv) about 4 to 10% of ash.

In some embodiments, the PAI produced by the above process has a unique composition relative to a pea protein isolate not derived by the present process. In particular, the PAI of the present invention comprises 70-90% protein content (N×6.25) on a dry basis. The PAI has significantly more albumin content than pea protein isolates derived from conventional processes. In some embodiments, the PAI has about 5 wt % to 30 wt % albumin content, on a dry basis. In addition, the albumin component comprises both PS1 albumin and PS2 albumin. Furthermore, the PAI protein is substantially in native form.

In some embodiments, the LAI produced by the above process has a unique composition relative to a pea protein isolate not derived by the present process. In particular, the LAI of the present invention comprises 70-90% protein content (N×6.25) on a dry basis. The LAI has significantly more albumin content than pea protein isolates derived from conventional processes. In some embodiments, the LAI has about 5 wt % to 30 wt % albumin content, on a dry basis. In addition, the albumin component comprises both PS1 albumin and PS2 albumin. Furthermore, the PAI protein is substantially in native form.

In some embodiments, the PAI produced by the above process has unique functionality associated with the albumin content. Such improved functionality may be, but is not limited to, improved foaming ability, improved emulsify ability, improved gelling ability, and improved ability to stay soluble at acidic pHs.

In some embodiments, the LAI produced by the above process has unique functionality associated with the albumin content. Such improved functionality may be, but is not limited to, improved foaming ability, improved emulsify ability, improved gelling ability, and improved ability to stay soluble at acidic pHs.

In some embodiments, the pea Albumin Isolate made by the above process has improved functionality. These functionalities include improved thermal stability and protein solubility. In some embodiments, the pea albumin isolate has thermal stability. In certain embodiments, the pea albumin isolate is thermally stable up to about 130° C. In certain embodiments, the pea albumin isolate has a thermal transition from about 130° C. to about 144° C. In certain embodiments, the pea albumin isolate has a thermal transition peak at about 134.5° C.

In some embodiments, the Legume Albumin Isolate made by the above process has improved functionality. These functionalities include improved thermal stability and protein solubility. In some embodiments, the legume albumin isolate has thermal stability. In certain embodiments, the legume albumin isolate is thermally stable up to about 130° C. In certain embodiments, the legume albumin isolate has a thermal transition from about 130° C. to about 144° C. In certain embodiments, the legume albumin isolate has a thermal transition peak at about 134.5° C.

In other embodiments, the pea albumin isolate has protein heat stability improved by at least 50% as compared with PPI produced by conventional PPI extraction process. In certain embodiments, the pea albumin isolate has protein heat stability improved by at least 50%, 55%, 60%, 65%, 70%, 75%, 80%, 85%, 90% as compared with conventional PPI produced by conventional PPI extraction process. In some embodiments, the pea albumin isolate has at least 90% purity, such as 90%, 91%, 92%, 93%, 94%, 95%, 96%, 97%, 98%, or more purity.

In other embodiments, the pea albumin isolate has protein heat stability improved by at least 50% as compared with LPI produced by conventional LPI extraction process. In certain embodiments, the legume albumin isolate has protein heat stability improved by at least 50%, 55%, 60%, 65%, 70%, 75%, 80%, 85%, 90% as compared with conventional LPI produced by conventional LPI extraction process. In some embodiments, the legume albumin isolate has at least 90% purity, such as 90%, 91%, 92%, 93%, 94%, 95%, 96%, 97%, 98%, or more purity.

In some embodiments, the pea albumin isolate is substantially in its native form. In some embodiments, the legume albumin isolate is substantially in its native form.

The pea albumin isolates of the present disclosures have a range of different purities. For instance, the pea albumin isolate may have at least about 75% to at least about 99%, at least about 75% to at least about 95%, at least about 75% to at least about 90%, at least about 75% to at least about 85%, at least about 75% to at least about 80%, at least about 85% to at least about 99%, at least about 85% to at least about 95%, at least about 85% to at least about 90%, at least about 85% to at least about 99%, at least about 85% to at least about 95%, at least about 85% to at least about 90%, at least about 90% to at least about 99%, or at least about 90% to at least about 95% protein purity. In some embodiments, the pea albumin isolate has at least about 85% to at least about 95% protein purity.

The legume albumin isolates of the present disclosures have a range of different purities. For instance, the legume albumin isolate may have at least about 75% to at least about 99%, at least about 75% to at least about 95%, at least about 75% to at least about 90%, at least about 75% to at least about 85%, at least about 75% to at least about 80%, at least about 85% to at least about 99%, at least about 85% to at least about 95%, at least about 85% to at least about 90%, at least about 85% to at least about 99%, at least about 85% to at least about 95%, at least about 85% to at least about 90%, at least about 90% to at least about 99%, or at least about 90% to at least about 95% protein purity. In some embodiments, the legume albumin isolate has at least about 85% to at least about 95% protein purity.

Use of the Pea Albumin Isolate

In one aspect of the invention, the present invention provides use of the pea albumin isolate of the present disclosure in the production of a foam.

In another aspect of the invention, the present invention provides use of the pea albumin isolate of the present disclosure in the production of a gel.

In still another aspect of the invention, the present invention provides use of the pea albumin isolate of the present disclosure in the production of an emulsion. In some embodiments, the emulsion is made from a mixture of equal parts oil and water.

In one aspect of the invention, the present invention provides a foam comprising the pea albumin isolate of the present disclosure.

In another aspect of the invention, the present invention provides a gel comprising the pea albumin isolate of the present disclosure.

In still another aspect of the invention, the present invention provides an emulsion comprising the pea albumin isolate of the present disclosure.

In one aspect of the invention, the present invention provides use of the pea albumin isolate of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese.

In another aspect, the present invention provides a food or beverage comprising the pea albumin isolate of the present disclosure.

In one aspect of the invention, the present invention provides use of the legume albumin isolate of the present disclosure in the production of a foam.

In another aspect of the invention, the present invention provides use of the legume albumin isolate of the present disclosure in the production of a gel.

In still another aspect of the invention, the present invention provides use of the legume albumin isolate of the present disclosure in the production of an emulsion. In some embodiments, the emulsion is made from a mixture of equal parts oil and water.

In one aspect of the invention, the present invention provides a foam comprising the legume albumin isolate of the present disclosure.

In another aspect of the invention, the present invention provides a gel comprising the legume albumin isolate of the present disclosure.

In still another aspect of the invention, the present invention provides an emulsion comprising the legume albumin isolate of the present disclosure.

In one aspect of the invention, the present invention provides use of the legume albumin isolate of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese.

In another aspect, the present invention provides a food or beverage comprising the legume albumin isolate of the present disclosure.

Exemplary Non-Limiting Aspects of the Disclosure

Aspects, including embodiments, of the present subject matter described above may be beneficial alone or in combination, with one or more other aspects or embodiments. Without limiting the foregoing description, certain non-limiting aspects of the disclosure numbered 1-51 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A pea albumin isolate (PAI) extraction process comprising:
   a) salt induced protein extraction from pea solubles:
      i) at a pH of about 3 to about 8,
      ii) at a temperature of about 18° C. to about 95° C.,
      iii) for about 30 to about 60 minutes,
      iii) with about 0.5 to about 5% concentration of Na, Ca, or Mg salt or a combination thereof,
   wherein the pea solubles are obtained from a pea protein isolate (PPI) extraction process.
2. The process of aspect 1, wherein the PPI extraction process is a conventional PPI extraction process.
3. The process of aspect 2, wherein the conventional PPI extraction process comprises an isoelectric precipitation (IEP) or alkaline extraction/isoelectric precipitation (AE/IEP).
4. The process of any one of aspects 1-3, wherein the PPI extraction process comprises a salt extraction step using Na, Ca, or Mg salt or a combination thereof in combination with IEP.
5. The process of aspect 1, wherein the PPI extraction process comprises:
   1) protein extraction from aqueous solution comprising pea flour
      i) at a pH of about 7 to 10,
      ii) at a temperature of about 18° C. to 60° C.,
      iii) for about 30 to 60 minutes for extraction,
   2) separation of solids from the aqueous solution, producing a liquid fraction,
   3) precipitation of protein comprising:
      i) precipitating protein at a pH about 4 to 8, at a temperature of about 18° C. to 95° C. for about 5 to 60 minutes,
      ii) optionally with Na, Ca, or Mg salt or combination thereof.
6. The process of aspect 5, wherein the protein extraction of step 1) comprises using Na, Ca, or Mg salt or a combination thereof.
7. The process of any one of aspects 1-6, wherein the Na, Ca, or Mg salt in the PPI extraction process in step a) is selected from NaCl, $CaCl_2$, $MgCl_2$, sodium hexametaphosphate (SHMP), sodium triphosphate (STP), $CaPOCl_3$, calcium perchlorate, sodium sulfite, sodium bisulfite, sodium thiocyanate and calcium thiocyanate, or combination thereof.
8. The process of aspect 7, wherein the salt in step a) is SHMP.
9. The process of aspect 7, wherein the salt in step a) is STP.
10. The process of aspect 7, wherein the salt in step a) is $CaPOCl_3$.
11. The process of any one of aspects 1-10, wherein the salt concentration in the PPI extraction process and step a) is about 0.5% to about 5%.
12. The process of any one of aspects 1-11, wherein the salt induced protein extraction of step a) is performed at a temperature of about 50° C. to about 95° C.
13. The process of any one of aspects 1-12, wherein solids concentration of the pea solubles in step a) is about 3 to 20%.
14. The process of any one of aspects 1-13, wherein the pea solubles has a protein content in the range of about 80 to about 93 wt % (N×6.25) on a dry basis.
15. The process of any one of aspects 1-14, wherein the pea solubles contains about 5 to about 30% albumin.
16. The process of any one of aspects 1-15, wherein the pea solubles comprises PS-I albumin and PS-II albumin.
17. The process of any one of aspects 1-16, comprising
   b) separation of PAI from the solution.
18. The process of aspect 17, further comprising
   c) washing protein albumin isolate from step b).
19. The process of aspect 18, further comprising
   d) dilution of protein slurry.
20. The process of aspect 19, further comprising
   e) homogenization and/or sterilization of protein slurry.

21. The process of aspect 20, further comprising
   f) drying protein slurry.
22. The process of aspect 17, wherein the separation of step b) is performed by centrifugation.
23. The process of aspect 22, wherein the centrifugation is performed at 5000 g for about 10 minutes at room temperature.
24. The process of aspect 22, wherein the centrifugation is performed at 15000 g for about 30 minutes at 4° C.
25. The process of aspect 18, wherein the washing of step c) is performed with water at the extraction pH.
26. The process of aspect 19, wherein the dilution of step d) is performed with water and adjusted to about pH 7.
27. The process of aspect 20, wherein the homogenization of step e) is homogenization of the protein slurry using high pressure homogenizer.
28. The process of aspect 20, wherein the sterilization of step e) is sterilizing the protein slurry in a direct steam injection.
29. The process of aspect 28, wherein the sterilization of step e) is performed at a temperature of about 75 to about 140° C. for about 2 seconds to about 10 minutes.
30. The process of aspect 21, wherein the drying protein slurry of step f) is performed by freeze drying or spray drying.
31. A pea albumin isolate (PAI) obtained by the process of any of aspects 1-30.
32. The PAI of aspect 31, wherein the PAI has a protein content in the range of about 70 to about 93 wt % (N×6.25) on a dry basis.
33. The PAI of aspect 32, wherein the PAI further comprises:
   i) less than about 1% of fat,
   ii) about 0.1 to 0.5% of phytates,
   iii) about 4 to 6% of carbohydrates, and
   iv) about 4 to 10% of ash.
34. The PAI of any one of aspects 31-33, wherein the PAI comprises PS-I albumin and PS-II albumin.
35. The PAI of any one of aspects 31-34, wherein the PAI has improved thermal stability over pea protein isolate derived from conventional methods.
36. The PAI of aspect 35, wherein the PAI is thermally stable up to about 130° C.
37. The PAI of aspect 36 having a thermal transition from about 130° C. to about 144° C.
38. The PAI of aspect 37 having a thermal transition peak at about 134.5° C.
39. The PAI of any one of aspects 31-38, wherein the pea albumin isolate has at least 92% purity.
40. The PAI of any one of aspects 31-39, wherein the pea albumin isolate is substantially in its native form.
41. Use of the PAI of any of aspects 31-40 in the production of a foam.
42. Use of the PAI of any of aspects 31-40 in the production of a gel.
43. Use of the PAI of any of aspects 31-40 in the production of an emulsion.
44. The use of the PAI of aspect 43, wherein the emulsion is made from a mixture of equal parts oil and water.
45. A foam comprising the PAI of any of aspects 31-40.
46. A gel comprising the PAI of any of aspects 31-40.
47. An emulsion comprising the PAI of any of aspects 31-40.
48. Use of the PAI of any of aspects 31-40 in a food or beverage application.
49. The use of the PAI of aspect 48, wherein the food or beverage application is selected from milk shake, protein bars, meat analogues, confectionary, condiments, mayonnaise, salad dressing, nutritional supplements and diary alternatives.
50. The use of aspect 49, wherein the dairy alternative is selected from creamers, ice cream, yogurt, buttermilk and cheese.
51. A food or beverage comprising the PAI of any of aspects 31-40.

EXAMPLES

The following examples are put forth so as to provide those of ordinary skill in the art with a complete disclosure and description of how to make and use the present invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, temperature is in degrees Centigrade, and times are in minutes.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

Example 1

Figure 2:
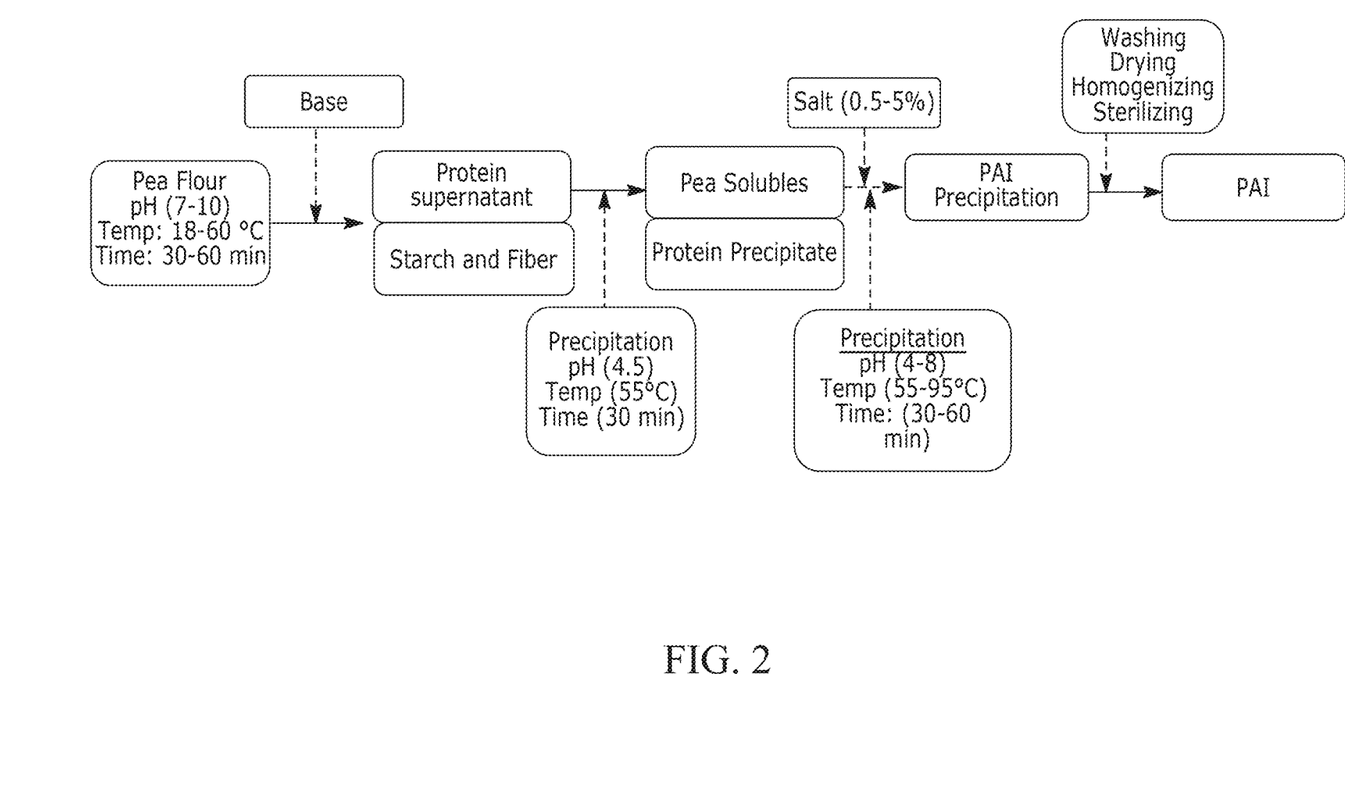
FIG. 2 depicts the PAI extraction process comprising salt induced protein extraction from pea solubles produced by the conventional PPI process, as one embodiment of the present disclosure.

The following example describes production of PAI from pea solubles derived from the process of FIG. 1. The full process is pictured in FIG. 2.

TABLE 1

| No. | Extraction | Process details |
|---|---|---|
| 1 | protein precipitation from a pea solubles | pH of extraction: 2.5 and 3.5<br>Time of extraction: 30 min<br>Temperature of extraction: 55° C.<br>SHMP 1%, 2% and 5%<br>Pea soluble concentration: 3% solid |
| 2 | Centrifugation | 5000 g for 10 minutes at room temperature |
| 3 | Wash of protein | Washing the protein with 2x water at precipitation pHs |
| 4 | Dilution | Diluting the protein slurry with 2x water and adjust its pH to pH 7 |
| 5 | Sterilization | Homogenizing the protein slurry using high pressure homogenizer<br>Sterilizing the protein slurry in a direct steam injection [DSI (75-140° C. for 2 seconds to 10 minutes)] |
| 6 | Drying | Drying the protein slurry by a freeze/spray drier |

Protein Purity

The pea albumin isolate from has a protein content of 80-92% on a dry basis and the protein composition contains albumin fractions with a molecular weight around ~25 kDa (PS1 albumin) and ~10 kDa (PS2 albumin).

TABLE 2

| Salt concentration | Protein Purity |
|---|---|
| SHMP 1% | 86-92% |
| SHMP 2% | 86-92% |
| SHMP 5% | 80-85% |

Protein Analysis: SDS-PAGE

Figure 3:
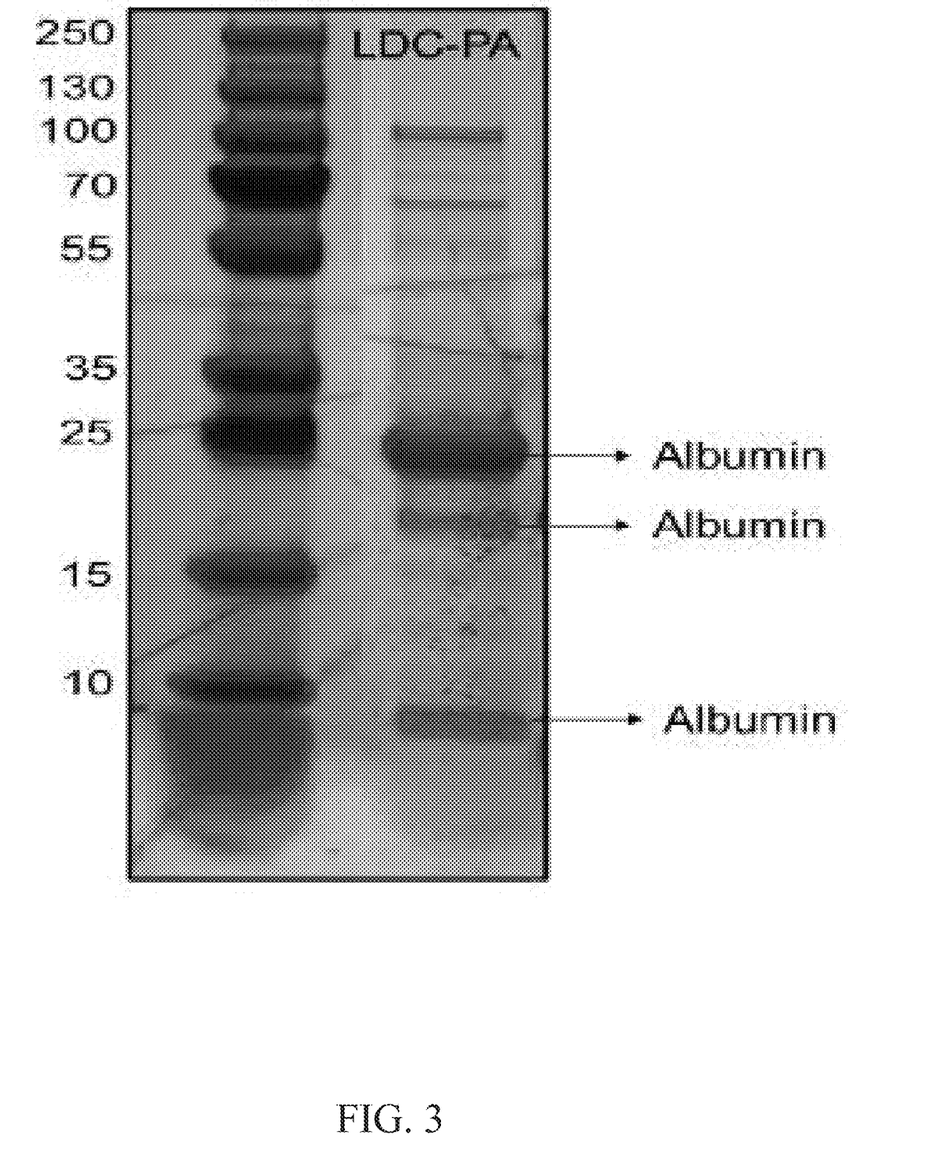
FIG. 3 depicts PAI analysis results showing pea albumin fraction of PAI by use of SDS PAGE.

The SDS-PAGE demonstrated increased concentration of albumin content in the PAI produced by the above process (right lane in FIG. 3) compared to conventional PPI (left lane in FIG. 3), indicating that the novel extraction technology enabled the precipitation of albumin.

DSC Analysis

Figure 4:
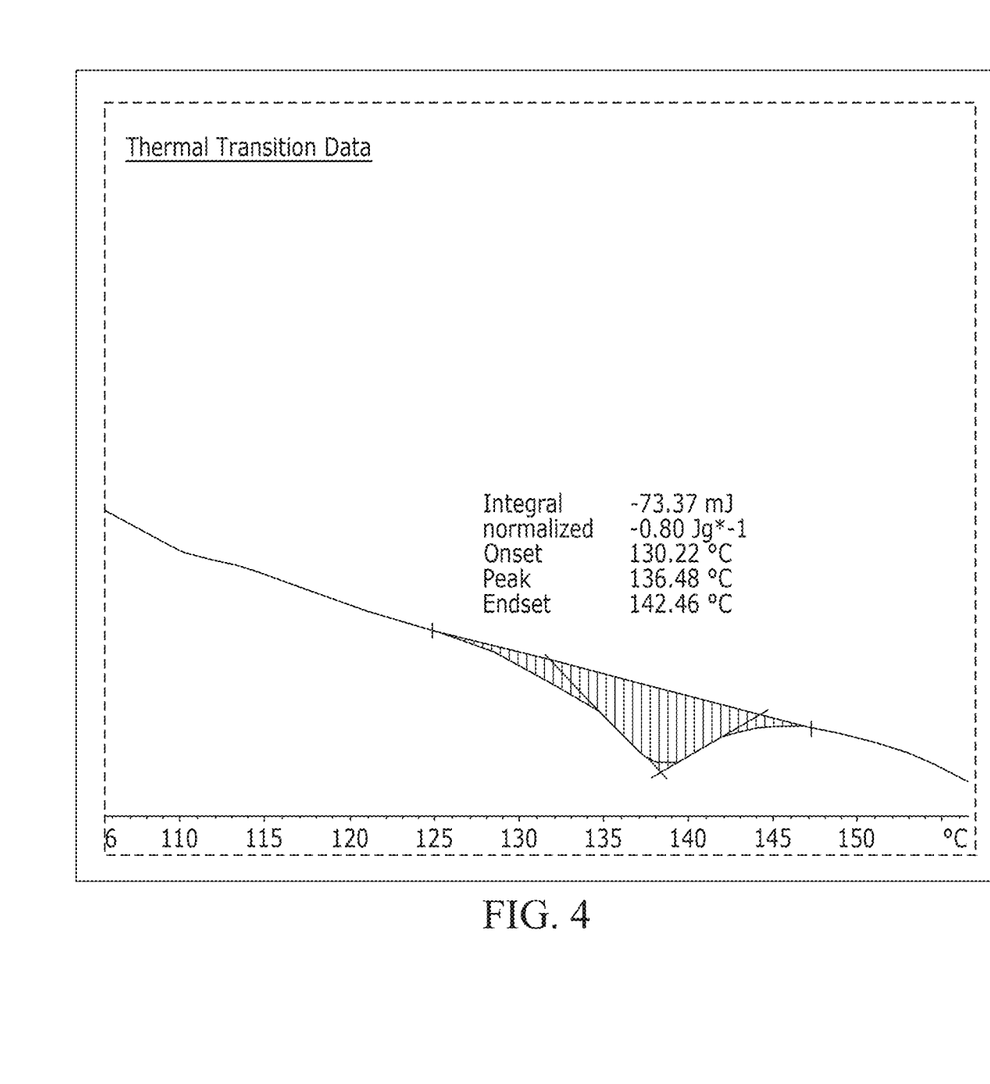
FIG. 4 depicts thermal transition data from differential scanning calorimeter of pea albumin fraction of PAI.

Thermal transition data were determined for the PAI using differential scanning calorimetry using standard methods using a METTLER TOLEDO DSC 3+(2022). FIG. 4 shows thermal transition data from the PAI. The product shows a distinct thermal transition, with an onset at about 130° C., peaking at about 134.5° C. and an offset at about 140° C., showing that the proteins are substantially in native form and the PAI has thermal stability up to about 130° C.

Protein Analysis: LapChip

The LabChip technique is used to demonstrate protein content in the PAI produced by the above process. Furthermore, the LabChip is used for protein assays for characterizing both proteins and nucleic acids. Various proteins (e.g., albumin, globulin etc.) in the sample are analyzed and quantified rapidly by the LabChip technique. Herein, LabChip® GXII Touch™ protein characterization system may be used for the protein analysis. This LabChip® GXII Touch™ protein characterization system provides the complete solution for reproducible quantitation, molecular weight sizing and percent purity analysis of protein samples. Any LabChip technique systems or devices can be used for the protein analysis and are well known in the art.

Example 2

The following example describes production of PAI from pea solubles derived from the process of FIG. 1. The full process is pictured in FIG. 2.

TABLE 3

| No. | Extraction | Process details |
|---|---|---|
| 1 | protein precipitation from a pea solubles | pH of extraction: 7 and 8.5<br>Time of extraction: 30 min<br>Temperature of extraction: 55° C.<br>$CaPOCl_3$ 5%<br>Pea soluble concentration: 3% solid |
| 2 | Centrifugation | 5000 g for 10 minutes at room temperature |
| 3 | Wash of protein | Washing the protein with 2x water at precipitation pHs |
| 4 | Dilution | Diluting the protein slurry with 2x water and adjust its pH to pH 7 |
| 5 | Sterilization | Homogenizing the protein slurry using high pressure homogenizer<br>Sterilizing the protein slurry in a direct steam injection [DSI (75-140° C. for 2 seconds to 10 minutes)] |
| 6 | Drying | Drying the protein slurry by a freeze/spray drier |

TABLE 4

| Salt concentration | Protein Purity |
|---|---|
| $CaPOCl_3$ | 80-85% |

Example 3

Figure 5:
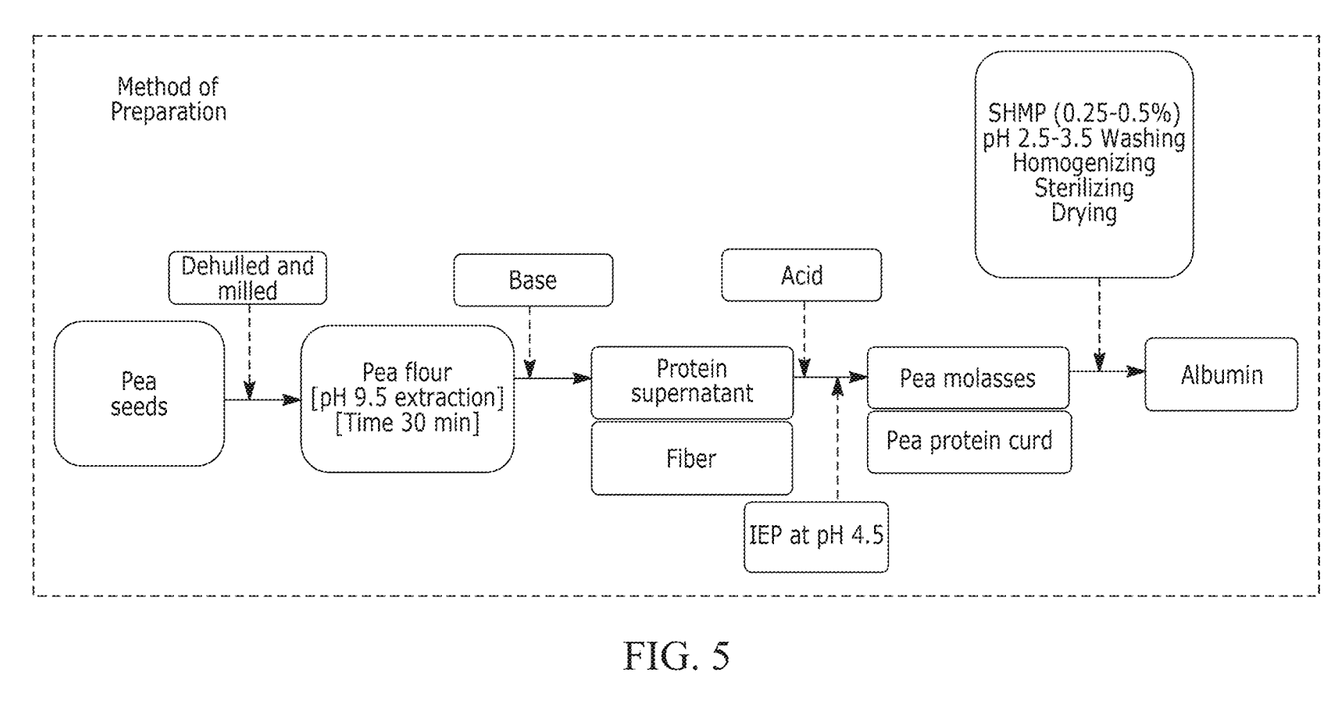
FIG. 5 depicts the PAI extraction process comprising salt induced protein extraction from pea solubles produced by the conventional PPI process, as one embodiment of the present disclosure.
Figure 6:
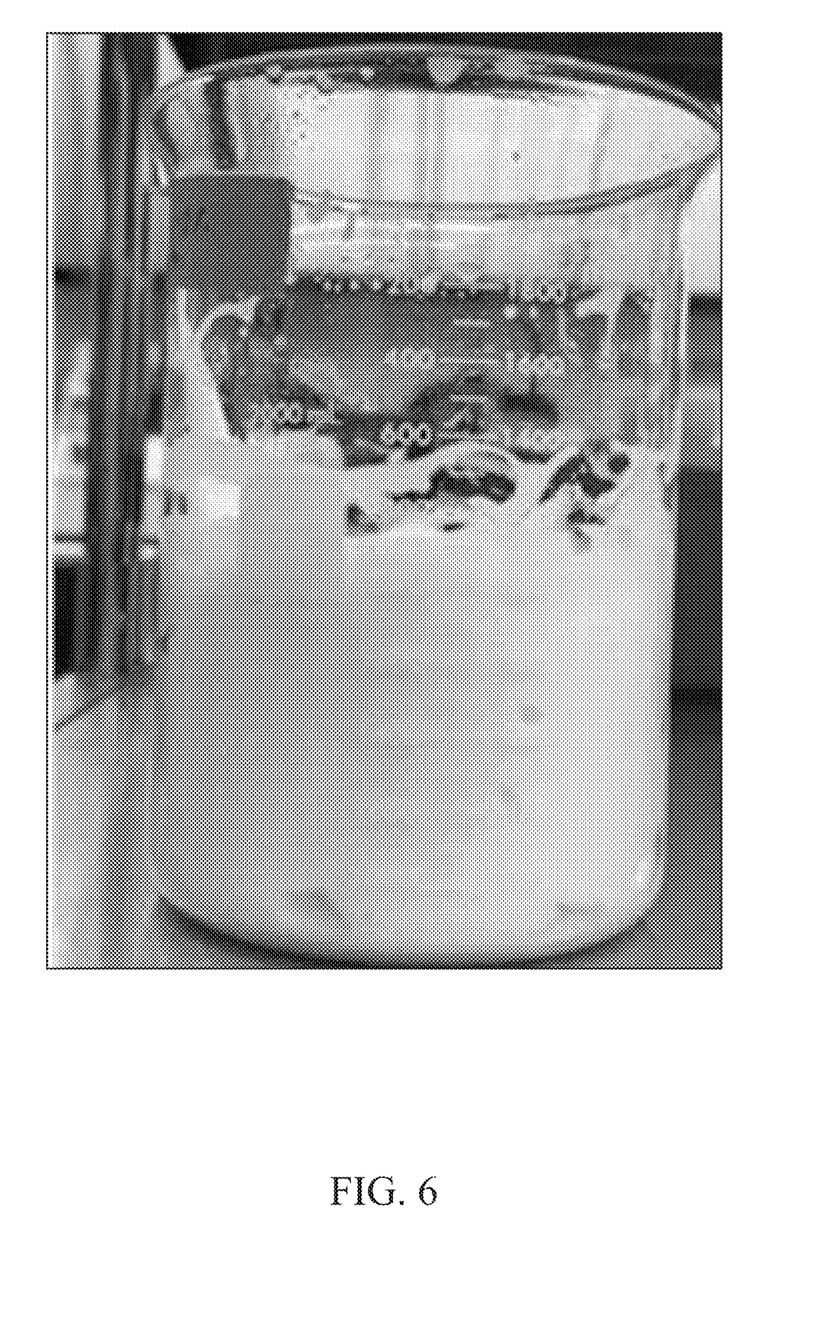
FIG. 6 depicts the foaming capacity for the pea albumin fraction of PAI produced by the methods disclosed herein.

The following example describes production of PAI from pea solubles derived from the process of FIG. 1. The full process is pictured in FIG. 5.

TABLE 5

| No. | Extraction | Process details |
|---|---|---|
| 1 | Albumin Precipitation from Pea Solubles | pH of extraction: 2.5-3.5<br>Time of extraction: 30 min<br>Temperature: 55° C.<br>SHMP: 0.25-0.5%<br>Concentration: 3% solid |
| 2 | Centrifugation | 5000 g for 10 minutes at room temperature |
| 3 | Wash of protein | Washing the protein with 2x water at precipitation pHs |
| 4 | Dilution | Diluting the protein slurry with 2x water and adjust its pH to pH 7 |
| 5 | Sterilization | Homogenizing the protein slurry using high pressure homogenizer<br>Sterilizing the protein slurry in a direct steam injection [DSI (75-140° C. for 2 seconds to 10 minutes)] |
| 6 | Drying | Drying the protein slurry by a freeze/spray drier |

The step-by step process used for PAI extraction as shown in Table 5 is as follows:
1. Pea Seeds:
   Dehulling and Milling: The raw pea seeds are dehulled and milled to produce pea flour. This step ensures the removal of the outer hull and the grinding of seeds into a fine flour, facilitating better extraction of proteins.
2. Pea Flour Extraction:
   Extraction at pH 9.5: The pea flour undergoes extraction at a high pH of 9.5 for 30 minutes. This alkaline environment helps to solubilize the proteins present in the flour. Base Treatment: The extracted mixture is treated with a base to separate the protein supernatant from the fiber. The fiber is removed, leaving a protein-rich solution.
3. Acid Treatment:
   Acid Treatment: The protein supernatant is then acidified to induce protein precipitation. Isoelectric precipitation (IEP) is carried out at pH 4.5, causing the proteins to coagulate and separate from the solution.
4. Intermediate Products:
   Pea Molasses and Pea Protein Curd: The acid treatment results in the formation of pea molasses and pea protein curd. The pea protein curd further washed and dried to produce PPI.
5. Albumin Extraction:
   Use of SHMP: Added SHMP (0.25-0.5%) to pea molasses at pH 2.5-3.5 to enhance albumin protein precipitation. The alb-protein curd is washed, and the pH is adjusted to 7 and further dried to obtain pea albumin isolate.
6. Albumin Extraction:
   Use of SHMP: Added SHMP (0.25-0.5%) to pea molasses at pH 2.5-3.5 to enhance albumin protein precipitation. The alb-protein curd is washed, and the pH is adjusted to 7 and further dried to obtain pea albumin isolate.

TABLE 6

| Salt Conc. | Protein Purity(%) | Protein Yield (%) |
| --- | --- | --- |
| 5% SHMP | ≥86% | 40-50% |
| 2% SHMP | ≥90% | 40-50% |
| 1% SHMP | ≥90% | 50-60% |
| 0.5% SHMP | ≥90% | 50-60% |
| 0.25% SHMP | ≥90% | 48-52% |

Table 6 presents the results of albumin separation from pea protein isolate (PPI) using various concentrations of sodium hexametaphosphate (SHMP), focusing on protein purity and yield. Using a 5% SHMP concentration results in a protein purity of ≥86% and a yield of 40-50%. At a 1% SHMP concentration, the process achieves a high protein purity of ≥90% and a better yield of 50-60%, indicating an optimal balance between purity and yield. A 0.25% SHMP concentration also maintains high protein purity of ≥90% but with a slightly lower yield of 48-52%. These results suggest that 1% SHMP is the most efficient concentration for albumin separation, providing high protein purity and the highest yield. Lower concentrations like 0.25% still achieve high purity but with reduced yield, while higher concentrations like 5% result in good purity but lower yield, making them less efficient. The pea albumin fraction (FIG. 2) and/or isolate has a protein content in the range of 70-90% on a dry basis and the protein composition contains albumin fractions with a molecular weight around ~25 kDa (PS1 albumin) and ~10 kDa (PS2 albumin).

What is claimed is:
1. A pea albumin isolate (PAI) extraction process comprising:
   a) performing a salt-induced protein extraction from pea solubles by contacting the pea solubles with a solution:
      i) at a pH of about 2 to about 5,
      ii) at a temperature of about 18° C. to about 95° C.,
      iii) for about 30 to about 60 minutes,
      iii) with about 0.1 to about 5% concentration of sodium hexametaphosphate (SHMP), thereby precipitating the PAI; and
   b) separating the PAI from the solution,
   wherein the pea solubles are obtained from a pea protein isolate (PPI) extraction process comprising:
      1) Protein extraction from aqueous solution comprising pea flour
         i) at a pH of about 7 to 10,
         ii) at a temperature of about 18° C. to 60° C.,
         iii) for about 30 to 60 minutes for extraction,
      2) separation of solids from the aqueous solution, producing a liquid fraction,
      3) precipitation of a protein fraction from the liquid fraction comprising:
         i) precipitating protein at a pH about 4 to 8, at a temperature of about 18° C. to 95° C. for about 5 to 60 minutes,
         ii) optionally with SHMP;
      4) separation of the liquid fraction from the protein fraction thereby forming the pea solubles.
2. The process of claim 1, wherein the protein extraction of step 1) comprises using Na, Ca, or Mg salt or a combination thereof.
3. The process of claim 1, wherein the salt concentration in the PPI extraction process is about 0.5% to about 5%.
4. The process of claim 1, wherein the salt induced protein extraction of step a) is performed at a temperature of about 50° C. to about 95° C.
5. The process of claim 1, wherein solids concentration of the pea solubles in step a) is about 3 to 20%.
6. The process of claim 1, wherein the pea solubles has a protein content in the range of about 80 to about 93 wt % (N×6.25) on a dry basis.
7. The process of claim 1, wherein the pea solubles contains about 5 to about 30% albumin.
8. The process of claim 1, wherein the pea solubles comprises PS-I albumin and PS-II albumin.
9. The process of claim 1, further comprising
   c) washing the protein albumin isolate from step b).
10. Process of claim 9, further comprising
    d) diluting the PAI in water to form a protein slurry.
11. The process of claim 10, further comprising
    e) homogenizing and/or sterilizing the protein slurry.
12. The process of claim 11, further comprising
    f) drying the protein slurry.
13. The process of claim 1, wherein the separating of step b) is performed by centrifugation.
14. The process of claim 9, wherein the washing of step c) is performed with water at the pH of the salt-induced protein extraction.

* * * * *